(12) United States Patent
Eastman

(10) Patent No.: US 8,287,282 B2
(45) Date of Patent: Oct. 16, 2012

(54) PRACTICE GOWN

(75) Inventor: Sarah Jane Eastman, Washington, DC (US)

(73) Assignee: HLD SJE IP, LLC, Washington, DC (US)

( * ) Notice: Subject to any disclaimer, the term of this patent is extended or adjusted under 35 U.S.C. 154(b) by 536 days.

(21) Appl. No.: 12/580,727

(22) Filed: Oct. 16, 2009

(65) Prior Publication Data
US 2011/0091861 A1 Apr. 21, 2011

(51) Int. Cl.
G09B 9/00 (2006.01)
(52) U.S. Cl. ...................................... 434/250
(58) Field of Classification Search .................. 434/247, 434/250, 255, 433; 2/47, 56, 69–72, 74, 2/273
See application file for complete search history.

(56) References Cited

U.S. PATENT DOCUMENTS

| | | | | |
|---|---|---|---|---|
| 518,378 A * | 4/1894 | Still | | 2/222 |
| 1,037,518 A * | 9/1912 | Paull | | 2/273 |
| 2,834,021 A * | 5/1958 | Landauer | | 2/273 |
| 2,903,706 A * | 9/1959 | Alberts et al. | | 2/215 |
| 3,665,516 A * | 5/1972 | Orovan | | 2/74 |
| 3,883,896 A * | 5/1975 | Cain | | 2/74 |
| 4,377,007 A * | 3/1983 | Sudjian | | 2/105 |
| 4,774,726 A * | 10/1988 | Garrett | | 2/105 |
| 5,173,965 A * | 12/1992 | Panner | | 2/105 |
| 5,546,606 A * | 8/1996 | Luckabaugh | | 2/217 |
| D402,439 S * | 12/1998 | Marks | | D2/757 |
| D445,999 S * | 8/2001 | Swiney | | D2/851 |
| 6,408,438 B1 * | 6/2002 | Mc Kee | | 2/69 |

* cited by examiner

Primary Examiner — Kurt Fernstrom
(74) Attorney, Agent, or Firm — Michael L. Greenberg, Esq.; Greenberg & Lieberman, LLC

(57) ABSTRACT

A clothing attachment that serves as a practice gown by connecting over the clothing of a wearer such that the clothing attachment is configured with weight, volume, and length markers to simulate the conditions of wearing a complete dress under actual conditions of that dress. In this manner, a wearer can simulate and otherwise practice engaging in activities for a wedding or ballroom dancing without risking damage to the actual dress or gown.

20 Claims, 4 Drawing Sheets

PRACTICE GOWN

FIELD OF THE PRESENT INVENTION

The present invention relates to an attachment that connects over the clothing of a wearer such that the attachment is configured with weight and length markers to simulate the conditions of wearing a complete dress or gown. In this manner, a wearer can simulate and otherwise practice engaging in activities for a wedding or ballroom dancing without risking damage to the actual dress or gown.

BACKGROUND OF THE PRESENT INVENTION

Specialty clothing such as wedding dresses are extremely voluminous in terms of material. At the same time, such items are more than mere articles of clothing due to the often intricate crafting and symbolism. Moreover, wedding dresses can be very expensive. In other words, specialty clothing such as wedding dresses are the centerpiece of an entire experience that some people look forward to for nearly their entire lives up until the actual wedding event. As such, a problem arises in that wedding dresses are subject to disaster big and small. In this regard, there is a need for a clothing attachment that helps the wearer practice wedding activities by simulating the effects of the actual dress without subjecting the actual dress to dirt, rips, and other stressful calamites.

It also is fair to say that many weddings do not relate simply to the actual walking down the aisle and vows. Instead, there is preparation involved. Wearers of wedding dresses often rehearse for the big day along with the wedding party. In addition, weddings also include time to take photographs at various locations. The wearer will travel via automobile and also find herself dealing with family and friends at all points during the event. Because of all these elements, wearers often want to practice moving around and getting comfortable wearing their wedding dress prior to the big day. The reason is because they want to avoid or minimize the conditions for accidents or harm to the actual dress. Therefore, there is a need for a training gown that simulates the weight, length, and volume of an actual dress so that the wearer can get as comfortable as possible prior to the event. The present invention solves this need by providing a clothing attachment that accounts for the weight and volume of the dress, while also other items such as the train and even spacing for others in the party to learn from prior to the event. In this manner, the wearer and her party can practice the wedding events during rehearsal, as well as other activities such as dancing, while also training to avoid stepping on the dress bottom, stepping on the train, catching the dress, or learning where proper placement of involved people.

Another issue is that while many wearers may want to practice walking, dancing and other activities relating to the use of their gown or dress, it is literally impossible for them to do so. This is because specialty dresses often do not even exist outside of a drawing or photo. Oftentimes, for example, a woman will select a custom dress that will have to be created in time for the big day. Even more likely is that a bride or other person in need of a speciality dress or gown will order a dress or gown from a picture, catalogue, online means, etc, and that article of clothing will need to be physically constructed. The same scenario also applies to dancers and pageant participants. This means that if the wearer wishes to practice or train under similar conditions as the event, the wearer will need a practice gown or dress that simulates the weight, dimensions and volume of the specialty article of clothing. The present invention solves this need.

The method of use of the present invention solves the issue of exposing the specialty article of clothing to the elements without adequate practice or training. In addition, the clothing attachment of the present invention solves this need by providing training for such items as volume, weight and length. In this manner, the present invention is significantly different for use as a practice or training method. Existing items such as U.S. Pat. No. 144,576 issued to Tage on Nov. 11, 1873 and U.S. Pat. No. 5,630,231 issued to Stevens on May 20, 1997 seek to assist people in mobility enhancement for their wedding dresses and trains. Stevens is a gathering clip for gowns and Tage offers an old-fashioned improvement in dress elevators. However, none of these items assist the wearer in practicing or training for their event with a clothing attachment that actually simulates the conditions and feel of the actual dress. In this manner, the present invention uniquely affords the wearer the opportunity to engage in rehearsals and other activities prior to the event in a scenario where the wearer and others in the party can practice and rehearse as if the actual dress is being used. Other clothing items such as U.S. Pat. No. 6,460,187 issued to Siegel on Oct. 8, 2002 also do not offer a method of simulating the effects of an actual dress for training and practice purposes.

SUMMARY OF THE PRESENT INVENTION

The present invention in its preferred embodiment is a practice dress that allows a wearer to simulate the weight, length and other unique aspects of a specialty dress without actually subjecting the wearer to risking damage or discomfort, as may be the case with wearing the real thing. In this manner, the present invention applies to such scenarios as wedding rehearsals and dance practice.

The present invention relates to a clothing attachment. The clothing attachment is secured to either the wearer or the clothing of the wearer via conventional means. Instead of being voluminous or otherwise configured like the actual dress, the clothing attachment is configured to fit onto the wearer only in areas where practice and training are appropriate. This practice and training can assist the wearer with practice walking, stopping, standing, dancing and otherwise moving in a simulated gown.

The clothing attachment itself in the preferred embodiment includes a train that extends toward the back of the clothing attachment. In addition, the length and extension of the bottom portion extends out from the waist connection. This assists the wearer in learning how to walk or dance without tripping or stepping on the bottom portion. This also assists others such as dance partners, grooms, and others within a wedding party from stepping on the train or bottom portion.

An additional embodiment of the present invention includes incorporating weights into either the interior lining or on the inside location of the bottom portion of the clothing attachment. In addition, linear markers in an embodiment are adjustable to help other people learn spacing or distance from the wearer of the present invention.

BRIEF DESCRIPTION OF THE PRESENT INVENTION

DETAILED DESCRIPTION OF THE PREFERRED EMBODIMENT

The present invention is a clothing attachment (5). The clothing attachment (5) functions as a training tool for dress and gown wearers. The training gleaned from the clothing attachment (5) of the present invention is to simulate the use of an actual dress or gown during rehearsals and other pre-event instances. More specifically, the simulation of an embodiment of the present invention includes providing the wearer with similar weight, length and distance conditions. This function operates to afford the wearer with actual training and practice relating to the wearing, dimension, construction, and other dynamics of an actual dress or gown. In this manner, the present invention offers a method of use relating to the clothing attachment (5) as it connects to the wearer such that the wearer can simulate the effects of an actual dress or gown through the wear and movement associated with the clothing attachment (5).

Figure 1:
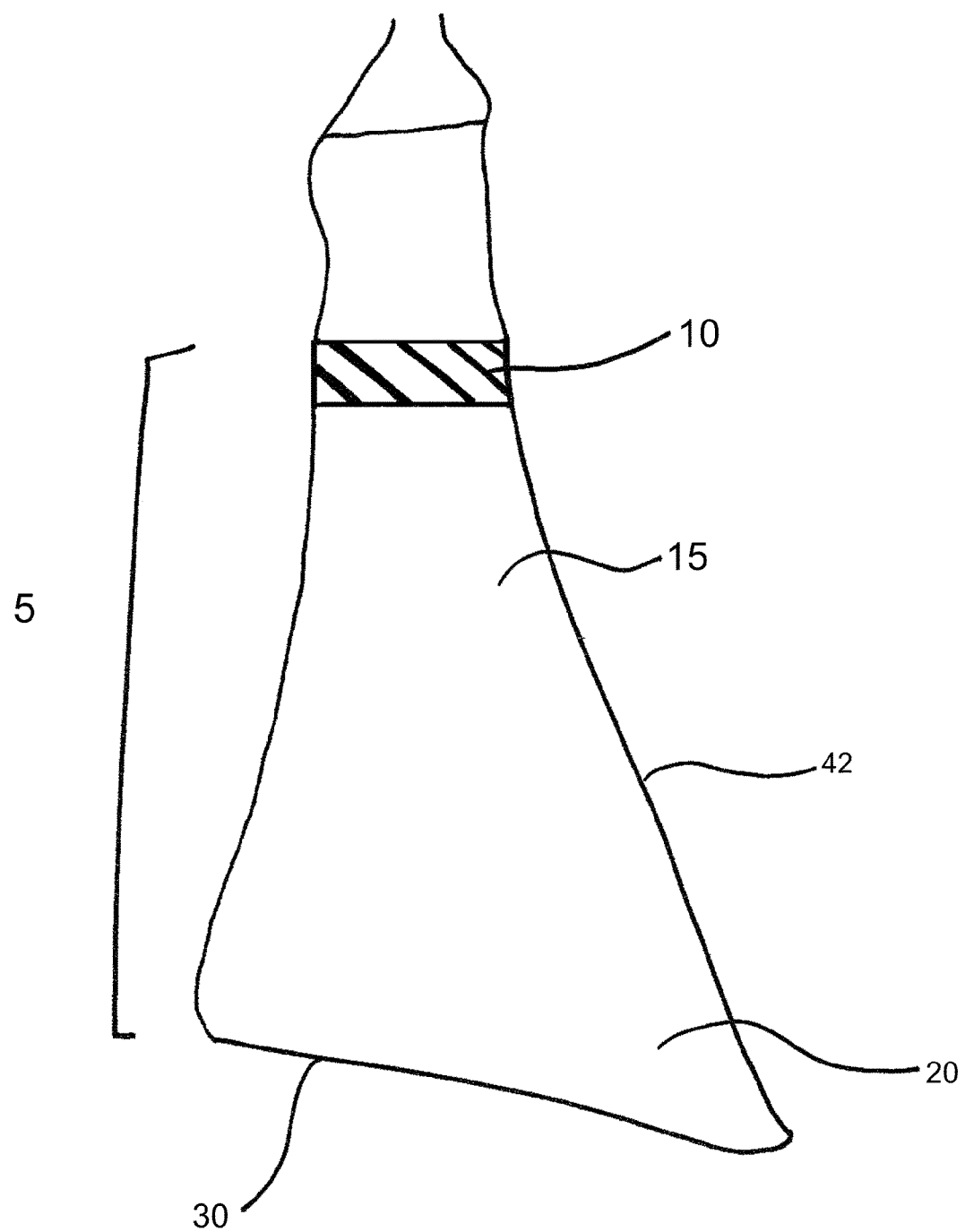
FIG. 1 is a side view of the preferred embodiment of the present invention.

FIG. 1 is a side view of the preferred embodiment of the present invention. As we see, a connection (10) is secured to the wearer. In the embodiment of FIG. 1, the connection (10) is constructed as a belt around the waist of the wearer, although clips or other conventional securing means are envisioned. The connection (10) serves as the attaching element between the clothing attachment (5) and the wearer and/or the wearer's clothing.

Attached to the connection (10) is the dress (15). The dress (15) also is referred to as a gown (15). It is important to note that the dress (15) is more in line with a skirt in terms of elements of wear. However, the clothing attachment (5) and dress (15) portion operate to simulate the effects and conditions of an actual dress or gown rather than typical function of a skirt. However, it is important to note that the preferred embodiment of the present invention is such that the front of the dress is open. As we see in FIG. 3, the dress (15) is crafted such that the dress (15) extends down from the connection (10) at the right side (17) and left side (19). In this manner, the right side (17) and the left side (19) do not meet at the front of the dress (15), and only begin communication in terms of the front with the clothing attachment (5) at the connection (10). In addition, the right side (17) and the left side (19) do meet in a more traditional manner in the back.

The dress (15) is composed of any material that is typically used for clothing. The dress (15) extends downward such that the train (20) extends from the back (42) of the dress (15). The bottom (30) of the dress (15) in terms of length and extension is configured to similarly match the configuration of the actual dress that is to be simulated by the present invention. In one embodiment, the clothing attachment (5) is constructed in such a manner to mimic the physical lengths, extensions and dimensions of an actual dress. This means that the bottom (30) of the present invention will be of a similar or the same length of the actual dress in order to train the wearer how best to walk, dance, stand and otherwise navigate without tripping on the bottom (30).

Figure 4:
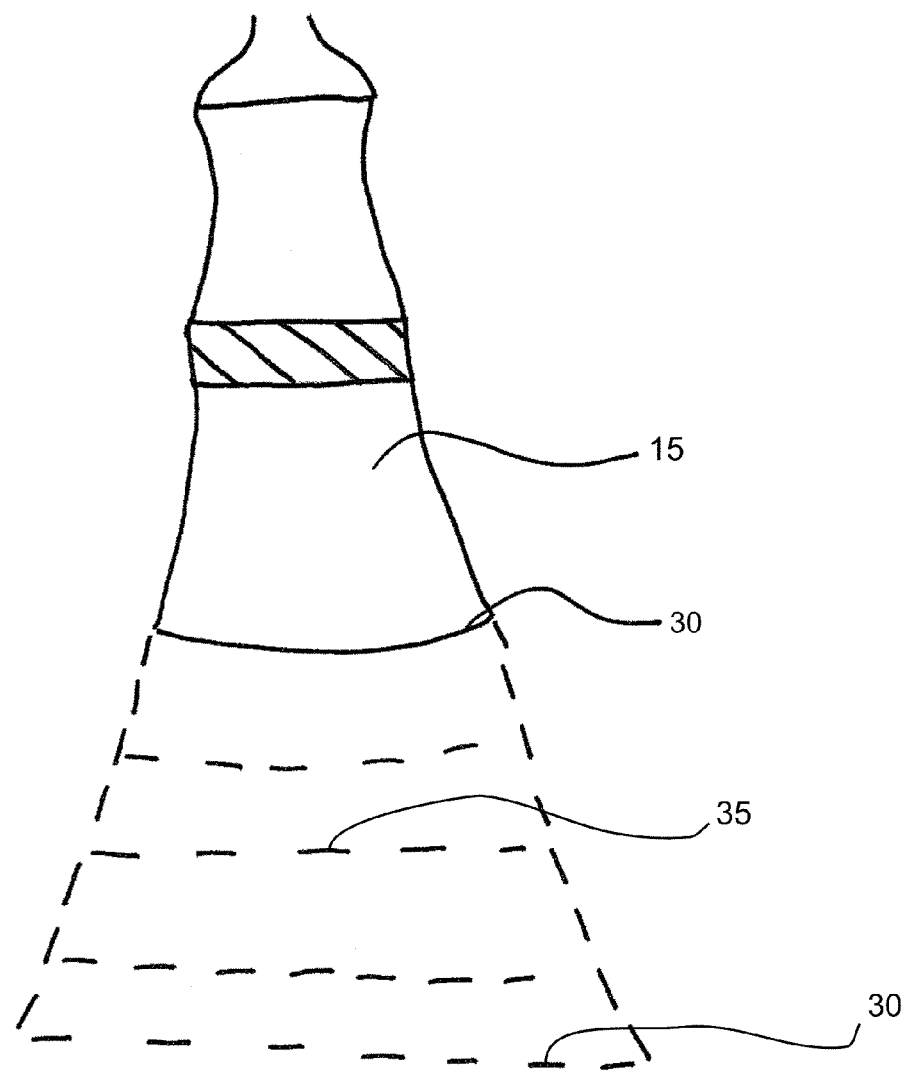
FIG. 4 is a view of an embodiment of the present invention relating to folding the bottom portion of the clothing attachment.

An additional embodiment relates to the dress (15) that extends downward from the connection (10). However, in this embodiment as seen in FIG. 4, the dress bottom (30) is folded into multiple folds via conventional means in terms of securing the folds (35). In this manner, the bottom (30) can be unfolded until the desired length of the dress (15) is obtained. The folds of the bottom (30) in this embodiment is not limited to extending straight down, but will also include extensions for a train (20), the back (42) and width of the bottom (30) depending on the style of the actual dress to be simulated. This folding of the bottom (30) of the present invention can be secured via such conventional means as VELCRO located within the folds (35) in such a manner that the wearer would fold the bottom (30) portions inward toward the wearer so that the folding connection elements are hidden from view.

Figure 2:
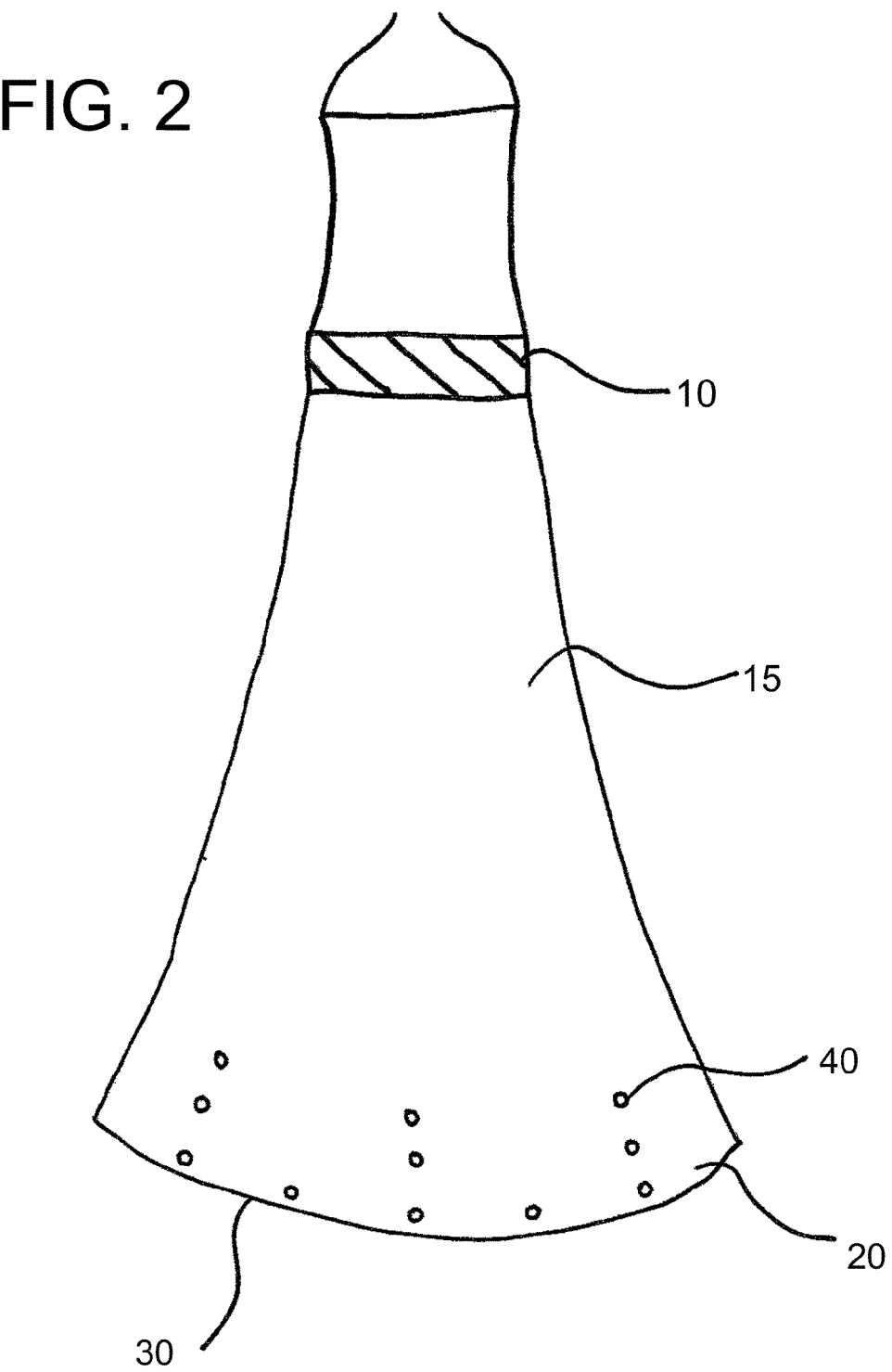
FIG. 2 is a rear view of the present invention.

FIG. 2 provides a view of an additional embodiment of the present invention. This embodiment relates to weights (40) being placed on the dress (15). In the preferred embodiment, the weights (40) would be positioned in the interior or outside of the dress (15). The weights (40) may be placed within the lining of the dress (15) or secured via conventional means to the fabric. The weights (40) themselves are envisioned to be of conventional weighted material and interspersed in strategic locations on the dress (15). The sizes of the weights (40) are envisioned to be the size of a quarter or half-dollar. The weights (40) are interspersed in strategic locations so that the wearer can still experience the flow of the dress (15) in a more natural manner. As such, the preferred embodiment is to place the weights (40) in strategic locations that include along the bottom (30) and the train (20). Weights (40), however, also can be placed in other areas of the dress (15) to simulate weight and volume of the wear of the actual dress. In fact, the purpose of placing the weights (40) onto the present invention is to simulate the effects of an actual dress or gown without forcing the wearer to practice under such constrictive or voluminous conditions.

An additional embodiment relates to lining the interior of the clothing attachment (5) with flexible conduits that lead to various positions along the clothing attachment (5) in much the same manner as with the weights (40). These positions in this additional embodiment include air sacs. The conduits lead through to the air sacs and ultimately lead up to the connection (10). At the connection (10), a conventional pump is attached to the conduit. The wearer may then use the pump to push air via conventional means through the conduit and into the air sacs, where the pump also can be locked to retain air and unlocked to release air from the air sacs. The placement of the air sacs permits the wearer the ability to increase or decrease weight and volume of the clothing attachment (5) in order to simulate the effects of the actual dress or gown. The embodiments relating to the weights (40), as well as air sac embodiment, also assist the wearer in gauging the flow, stability and movement of the bottom of the actual dress through the weighted or bulked up function of the bottom (30) of the clothing attachment (5). In this manner, the wearer can use the present invention to train in how to walk in accordance with the dimensions and make of the actual dress or gown. This means that weighted bottom (30) of the clothing apparatus (5) will offer practice for the wearer to avoid tripping on the bottom of the actual dress or otherwise prevent other mishaps.

An additional embodiment of the present invention also achieves the simulating effect as described above through the use of a retraction mechanism to train the wearer with the effects of a bustle. In this embodiment, the train (20) is slid underneath the outward lining of the fabric at the back of the clothing attachment (5). A retracting handle located at the connection (10) is connected to the train (20). Inside the lining of the back of the clothing attachment (5), or in a preferred embodiment rolled into the back of the connection (10), the train (20) can be pulled to retract the train (20) or pushed downward via a solid retracting handle to extend the train (20). In this manner, the wearer can adjust the length of the train (20) to better match the length of the actual dress or gown.

Figure 3:
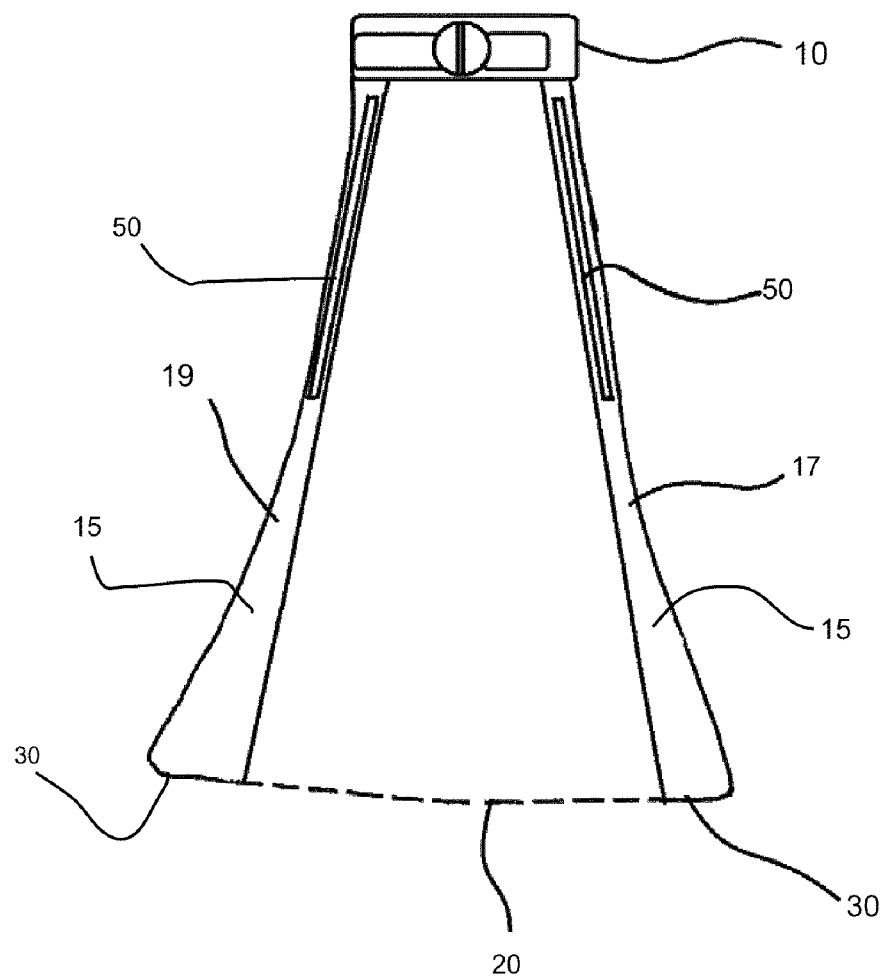
FIG. 3 is a front view of the present invention.

FIG. 3 provides a view of an additional embodiment of the present invention in the context of a front view. In the embodiment of FIG. 3, linear markers (50) attached to the dress (15) are retractable or telescoping in such a manner that the linear markers (50) are configured to extend outward to a desirable distance away from the dress (15). The linear markers (50) are attached to the dress (15) or connection (10) via conventional means. However, in one embodiment, the linear markers (50) are stowed in pouches or flaps sewn into the dress (15) or connection (10) or otherwise clothing attachment (5). In this manner, the linear markers (50) are out of the way and generally out of sight. When the wearer wants to deploy a linear marker (50), the wearer removes the linear marker (50) from the pouch or flap by undoing the flap or pouch. The pouch or flap in this embodiment is connected via conventional means to the clothing attachment (5), with one end of the pouch or flap being removable so that once the one end is removed or undone from the clothing apparatus (5), the linear marker (50) is exposed and can be lifted outward and telescoped or retracted. The embodiment of FIG. 3 serves the purpose of marking distance between the wearer and other people or objects. This means that the linear markers (50) operate as additional training elements for both the wearer and other participants in preparation for an actual choreographed event.

The embodiment of FIG. 3 also assists in keeping proper pace. For example, during a wedding rehearsal, linear markers (50) placed and protruding outward at the front of the clothing attachment (5) and the rear of the clothing attachment (5) can provide measuring zones for others. In this way, the other person will know to keep between the two linear markers (50). An additional embodiment relates to a pace-keeping device that teaches the wearer and/or others involved in the rehearsal the pace or rhythm required for the actual event. One embodiment is to include a conventional metronome in the connection (10).

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:

1. A training method for clothing, comprising:
    connecting a clothing attachment to a wearer via a connection;
    attaching a dress to the connection;
    extending the dress downward such that a train extends from a back of the dress;
    forming the dress such that the dress is open at a front, the dress having a right side and a left side in communication at the front via the connection; and
    configuring a bottom of the dress to match length and extensions of an actual dress.

2. The training method for clothing of claim 1, further comprising forming the dress such that the bottom is configured to fold into multiple folds.

3. The training method for clothing of claim 2, further comprising unfolding the bottom until achieving a desired length of the dress.

4. The training method for clothing of claim 2, further comprising configuring the train to fold into multiple folds.

5. The training method for clothing of claim 4, further comprising unfolding the bottom until achieving a desired length of the dress.

6. The training method for clothing of claim 2, further comprising securing the multiple folds at a specific length.

7. The training method for clothing of claim 1, further comprising placing weights on the dress.

8. The training method for clothing of claim 7, further comprising placing the weights within the lining of the clothing attachment.

9. The training method for clothing of claim 7, further comprising interspersing the weights along the bottom and along the train.

10. The training method for clothing of claim 1, further comprising simulating effects of an actual dress via the clothing attachment.

11. The training method for clothing of claim 1, further comprising lining an interior of the clothing attachment with a flexible conduit that lead to air sacs located along the interior of the clothing attachment, the flexible conduit leading back up to the connection.

12. The training method for clothing of claim 11, further comprising attaching a conventional pump to the flexible conduit such that the pump is configured to push air through the flexible conduit and into the air sacs.

13. The training method for clothing of claim 1, further comprising simulating effects of a bustle via a retraction mechanism that is slid underneath lining at the back such that a retracting handle located at the connection is connected to the train and can be pushed upward and downward to retract and extend the train.

14. The training method for clothing of claim 1, further comprising marking distance between the clothing attachment and outside elements via linear markers attached to the clothing attachment such that the linear markers are configured to extend and retract away and toward the clothing attachment.

15. A training method for clothing, comprising:
    attaching a dress to the connection;
    extending the dress downward such that a train extends from a back of the dress; and
    configuring a bottom of the dress to match length and extensions of an actual dress;
    further comprising forming the dress such that the bottom is configured to fold into multiple folds;
    further comprising unfolding the bottom until achieving a desired length of the dress;
    further comprising configuring the train to fold into multiple folds;
    further comprising securing the multiple folds at a specific length;
    further comprising placing weights on the dress;
    further comprising placing the weights within the lining of the clothing attachment;
    further comprising interspersing the weights along the bottom and along the train;
    further comprising simulating effects of an actual dress via the clothing;
    further comprising lining an interior of the clothing attachment with a flexible conduit that lead to air sacs located along the interior of the clothing attachment, the flexible conduit leading back up to the connection;
    further comprising attaching a conventional pump to the flexible conduit such that the pump is configured to push air through the flexible conduit and into the air sacs;
    further comprising simulating effects of a bustle via a retraction mechanism that is slid underneath lining at the back such that a retracting handle located at the connection is connected to the train and can be pushed upward and downward to retract and extend the train; and
    further comprising marking distance between the clothing attachment and outside elements via linear markings attached to the clothing attachment such that the linear markers are configured to extend and retract away and toward the clothing attachment.

16. A training apparatus for clothing, comprising:
a clothing attachment configured to have a connection, a dress, a bottom and a train;
said connection configured to be secured to a wearer;
said dress configured to extend downward from the connection;
said dress open at the front via a right side and a left side;
said train configured to extend downward from a back of said dress; and
said bottom configured to fold into multiple folds inward toward the interior of said dress such that each fold of said bottom can be secured.

17. The training apparatus of claim 16, wherein weights are placed on said clothing attachment.

18. The training apparatus of claim 16, wherein a retraction mechanism is located underneath the lining of the back of said clothing attachment such that a retracting handle located at said connection is connected to said train and is configured to be pushed upward and downward to retract and extend said train.

19. The training apparatus of claim 16, wherein a pump is in communication to a flexible conduit such that said pump is configured to push air through said flexible conduit and into air sacs, said air sacs located within the lining of said clothing attachment.

20. The training apparatus of claim 16, wherein linear markings are attached to said clothing attachment such that said linear markers are configured to extend and retract away and toward said clothing attachment.

* * * * *